(12) United States Patent
Burger et al.

(10) Patent No.: US 6,863,972 B2
(45) Date of Patent: Mar. 8, 2005

(54) SYNTHETIC WOOD COMPONENT HAVING A FOAMED POLYMER BACKING

(75) Inventors: Christopher C. Burger, Dublin, OH (US); Jeffrey R. Brandt, Blacklick, OH (US); David W. Smith, Bexley, OH (US); John P. Frechette, Powell, OH (US); Kevin T. Burt, Columbus, OH (US)

(73) Assignee: Crane Plastics Company LLC, Columbus, OH (US)

( * ) Notice: Subject to any disclaimer, the term of this patent is extended or adjusted under 35 U.S.C. 154(b) by 12 days.

(21) Appl. No.: 09/758,001

(22) Filed: Jan. 9, 2001

(65) Prior Publication Data

US 2002/0090471 A1 Jul. 11, 2002

(51) Int. Cl.[7] .............................. B32B 27/00; E04C 1/00
(52) U.S. Cl. ................................ 428/319.3; 428/317.9; 428/537.1; 52/309.4; 52/309.8; 52/309.9; 52/309.15
(58) Field of Search .......................... 428/308.8, 308.4, 428/311.71, 311.91, 317.9, 319.3, 537.1; 52/309.4, 309.8, 309.9, 309.15

(56) References Cited

U.S. PATENT DOCUMENTS

| | | | | |
|---|---|---|---|---|
| 4,241,125 A | | 12/1980 | Canning et al. | 428/158 |
| 4,351,873 A | * | 9/1982 | Davis | 428/198 |
| 4,818,590 A | * | 4/1989 | Prince et al. | 428/213 |
| 5,091,436 A | | 2/1992 | Frisch et al. | 521/137 |
| 5,110,843 A | | 5/1992 | Bries et al. | 521/159 |
| 5,160,784 A | | 11/1992 | Shmidt et al. | 428/316.6 |
| 5,218,807 A | * | 6/1993 | Fulford | 52/455 |
| 5,474,722 A | * | 12/1995 | Woodhams | 264/45.3 |
| 5,486,553 A | * | 1/1996 | Deaner et al. | 524/13 |
| 5,538,777 A | | 7/1996 | Pauley et al. | 428/122 |
| 5,735,092 A | | 4/1998 | Clayton et al. | 52/309.9 |
| 5,776,841 A | * | 7/1998 | Bondoc et al. | 442/320 |
| 5,795,641 A | | 8/1998 | Pauley et al. | 428/134 |
| 5,807,514 A | * | 9/1998 | Grinshpun et al. | 264/46.6 |
| 5,863,064 A | * | 1/1999 | Rheinlander et al. | 280/732 |
| 5,866,264 A | | 2/1999 | Zehner et al. | 428/481 |
| 5,882,564 A | | 3/1999 | Puppin | 264/177.16 |
| 5,910,358 A | | 6/1999 | Thoen et al. | 428/316.6 |
| 5,965,075 A | | 10/1999 | Pauley et al. | 264/176.1 |
| 6,044,604 A | | 4/2000 | Clayton et al. | 52/309.9 |
| 6,054,207 A | | 4/2000 | Finley | 428/317.9 |
| 6,106,944 A | | 8/2000 | Heikkila et al. | 428/397 |
| 6,114,008 A | | 9/2000 | Eby et al. | 428/151 |
| 6,122,877 A | * | 9/2000 | Hendrickson et al. | 52/520 |
| 6,265,037 B1 | * | 7/2001 | Godavarti et al. | 428/34 |
| 6,295,777 B1 | | 10/2001 | Hunter et al. | 52/519 |
| 6,344,268 B1 | * | 2/2002 | Stucky et al. | 428/317.9 |
| 6,579,605 B2 | * | 6/2003 | Zehner | 428/319.9 |
| 6,605,245 B1 | | 8/2003 | Dubelsten et al. | 264/446 |
| 2002/0192401 A1 | | 12/2002 | Matsumoto et al. | 428/15 |
| 2002/0192431 A1 | | 12/2002 | Edgman | 428/181 |

* cited by examiner

Primary Examiner—Terrel Morris
Assistant Examiner—Hai Vo
(74) Attorney, Agent, or Firm—Standley Law Group LLP

(57) ABSTRACT

The present invention is a component having a synthetic wood layer that is secured to a foamed polymer layer. The foamed polymer layer is comprised of a polymer selected from the group consisting of high density polyethylene, polypropylene, polyvinyl chloride, low density polyethylene, chlorinated polyvinyl chloride, acrylonitrile butadiene styrene, ethyl-vinyl acetate, and polystyrene. The component can be used for a variety of different purposes such as fencing, furniture, cabinets, storage devices, lawn edging, flower boxes, flooring, roofing, wall covering, building siding, basement flooring, basement wall covering, interior and exterior decorative house moldings, crown moldings, chair rails, picture frames, porch decks, deck railings, window moldings, window components, door components, door moldings, various other lawn and garden uses, various other below grade uses, and various other indoor and outdoor uses.

18 Claims, 8 Drawing Sheets

SYNTHETIC WOOD COMPONENT HAVING A FOAMED POLYMER BACKING

BACKGROUND AND SUMMARY OF THE INVENTION

The present invention relates generally to a synthetic wood component and, more particularly, to a synthetic wood component having a foamed polymer backing.

The supply of natural woods for construction and other purposes is dwindling. As a result, many are concerned about conserving the world's forests, and the cost of natural woods has risen. In light of these factors, a tremendous demand has developed in recent years for synthetic wood composites that exhibit the look and feel of natural woods.

Synthetic wood composites are used as replacements for all-natural wood, particleboard, wafer board, and other similar materials. Examples of synthetic wood composites include cellulosic/polymer composites and inorganic-filled polymer composites. As compared to natural woods, synthetic wood composites offer superior resistance to wear and tear. In particular, synthetic wood composites have enhanced resistance to decay, deterioration, and splintering. Moreover, synthetic wood composites may be sawed, sanded, shaped, turned, fastened, and finished in the same manner as natural woods. Also, synthetic wood composites can be embossed or otherwise textured to promote a wood grain appearance. Therefore, synthetic wood composites are commonly used for applications such as interior and exterior decorative house moldings, picture frames, furniture, porch decks, deck railings, window moldings, window components, door components, roofing structures, building siding, and other suitable indoor and outdoor items.

Nevertheless, despite the many advantages as compared to natural wood, 100% synthetic wood components may also suffer from some shortcomings. First, 100% synthetic wood components may be difficult and costly to manufacture. For instance, the composition ingredients may be expensive (e.g., additives to improve processing, resistance to discoloration, mildew resistance, and ultraviolet light screening ability), and storage of the substantial amount of cellulosic material in a moisture-controlled environment may be cumbersome and expensive. Also, 100% synthetic wood components may be heavy, thereby increasing the difficulty of transportation and installation. In addition, 100% synthetic wood components may be subject to some cracking, weathering, and deterioration over a period of time if the cellulosic content is high. Moreover, 100% synthetic wood components may be weaker in some applications than plastic compositions that do not have any cellulosic content. As a result, 100% synthetic wood components may not adequately bear attachment systems which connect adjacent components or which connect the components to an underlying structure.

In light of the aforementioned shortcomings of 100% synthetic wood components, a need exists for decreasing the cost of manufacturing components while still maintaining a synthetic wood facade. A need also exists for decreasing the weight of components having a synthetic wood facade. In addition, there is a need for increasing the strength, durability, and weatherability of components having a synthetic wood facade.

The present invention provides a component having a synthetic wood layer that is secured to a foamed polymer layer. It is preferred that the synthetic wood layer is the outer layer. However, the foamed polymer layer may be the outer layer. Securing a foamed polymer layer to the synthetic wood layer reduces the amount of synthetic wood material required to form the component. In addition, the foamed polymer layer may be lighter and less susceptible to cracking, splintering, and deterioration than synthetic wood. Consequently, as compared to 100% synthetic wood components, a component of the present invention may be lighter, cheaper to manufacture, and less susceptible to cracking, deterioration, and other environmental harm.

In addition to the novel features and advantages mentioned above, other objects and advantages of the present invention will be readily apparent from the following descriptions of the drawings and exemplary embodiments.

DETAILED DESCRIPTION OF EXEMPLARY EMBODIMENT(S)

Figure 1:
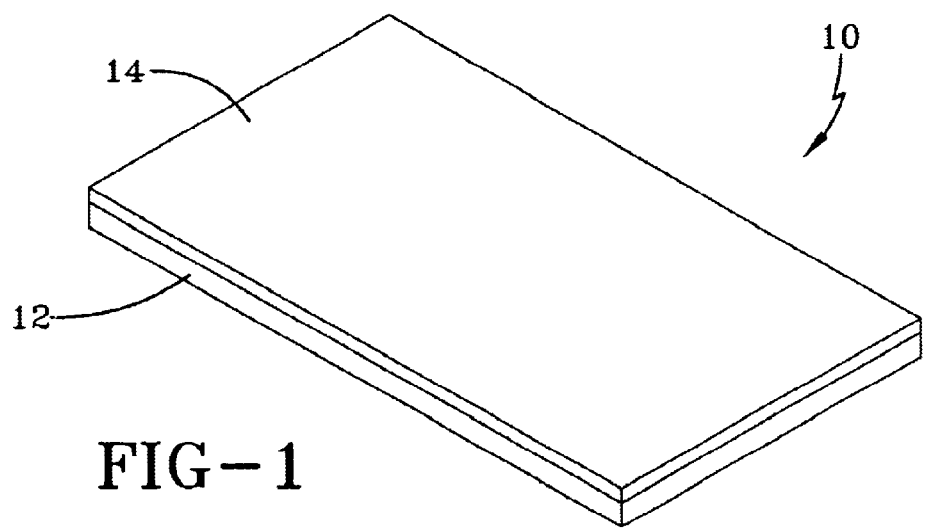
FIG. 1 is a perspective view of one embodiment of a component of the present invention.

The present invention is directed to a component that has a synthetic wood layer secured to a foamed polymer layer. FIG. 1 shows an example of a component 10 of the present invention. The component 10 is comprised of a foamed polymer layer 12 and a synthetic wood layer 14. The two layers may form the shape of the entire component. However, it should be recognized that the two layers may form only a portion of the entire component.

In alternative embodiments of the present invention, the component 10 may include other layers which may or may not be synthetic wood layers or foamed polymer layers. For example, a stain resistant urethane or acrylic coating with ultraviolet resistant additive may be applied on the synthetic wood layer 14, or an ultraviolet resistant polymer may be extruded over top of the synthetic wood layer 14. In addition, one or more layers, e.g., a tie layer, may be interposed between the foamed polymer layer 12 and the synthetic wood layer 14.

Figure 2:
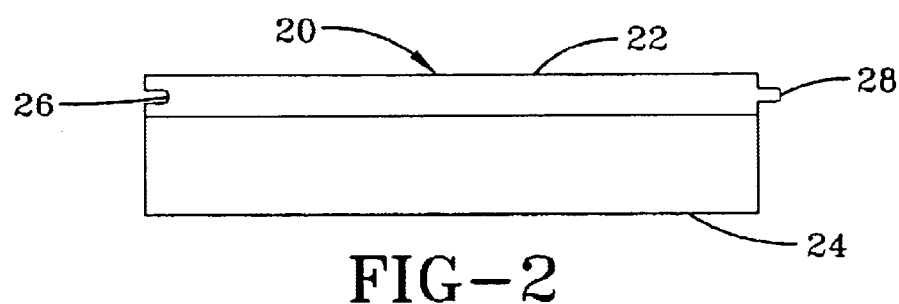
FIG. 2 is an end elevation view of a second embodiment of a component of the present invention.
Figure 3:
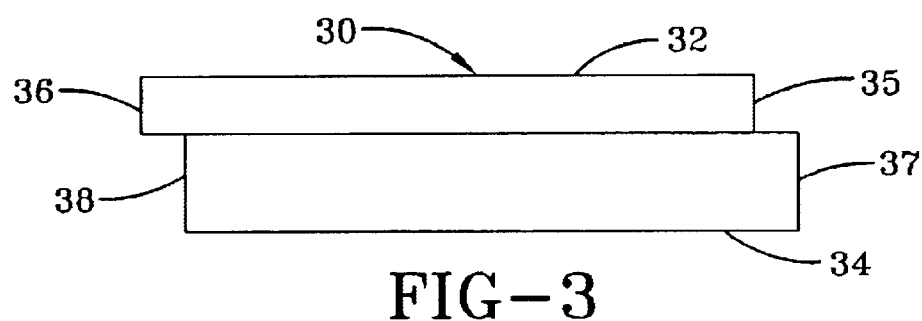
FIG. 3 is an end elevation view of a third embodiment of a component of the present invention.
Figure 4:
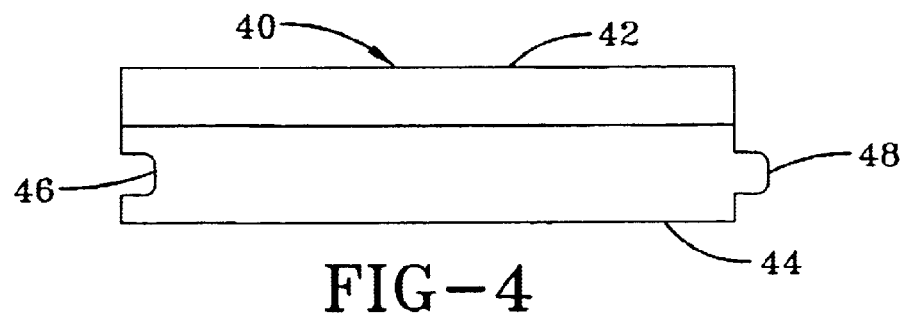
FIG. 4 is an end elevation view of a fourth embodiment of a component of the present invention.

If desired, one component of the present invention may be connected to another component by any desired means. For instance, one component of the present invention may simply be abutted against another component. In addition, FIGS. 2 through 4 show some other examples to facilitate connecting one component of the present invention to another. In FIG. 2, the component 20 is comprised of synthetic wood layer 22 and a foamed polymer layer 24. In this example, one side edge of the synthetic wood layer 22 defines a groove 26 that is adapted to receive a tongue of an adjacent component, and another side of the synthetic wood layer 22 defines a tongue 28 that is adapted to fit in a groove of another adjacent component. On the other hand, FIG. 3 illustrates a component 30 having a synthetic wood layer 32 and a foamed polymer layer 34. In this embodiment, the side edge 36 of the synthetic wood layer 32 extends beyond the side edge 38 of the foamed polymer layer 34, and side edge 37 of the foamed polymer layer 34 extends beyond the side edge 35 of the synthetic wood layer 32. As a result, component 30 may overlap adjacent components to provide an interconnecting fit. Lastly, the component 40 of FIG. 4 is comprised of synthetic wood layer 42 and a foamed polymer layer 44. As opposed to FIG. 2, one side edge of the foamed polymer layer 44 defines a groove 46 that is adapted to receive a tongue of an adjacent component, and another side of the foamed polymer layer 44 defines a tongue 48 that is adapted to fit in a groove of another adjacent component.

Figure 5:
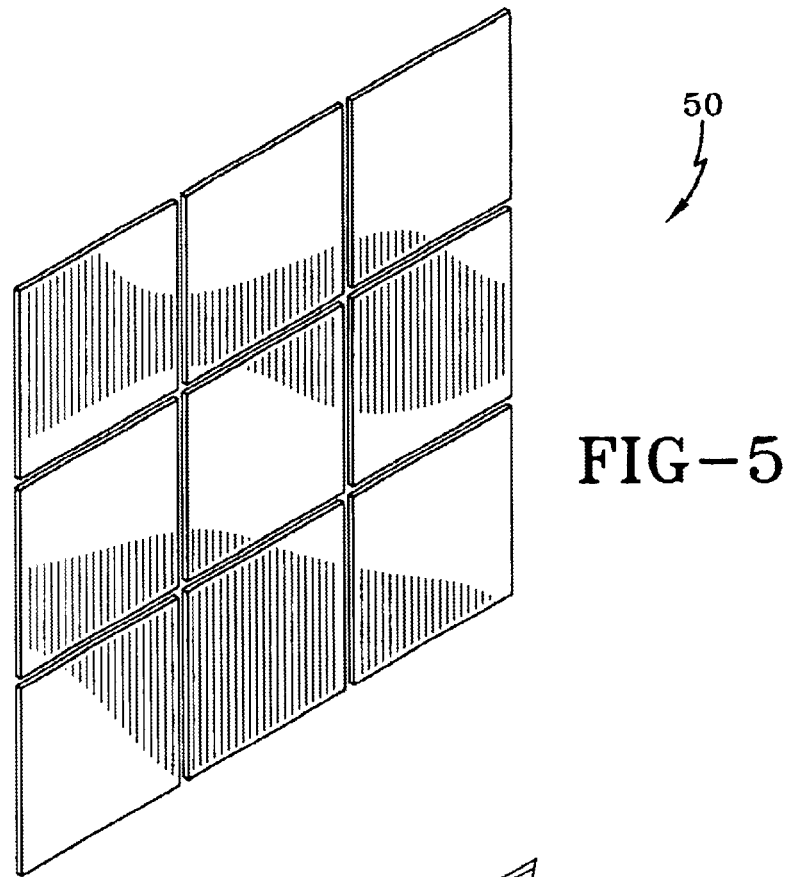
FIG. 5 is a perspective view of one embodiment of a floor system of the present invention.
Figure 6:
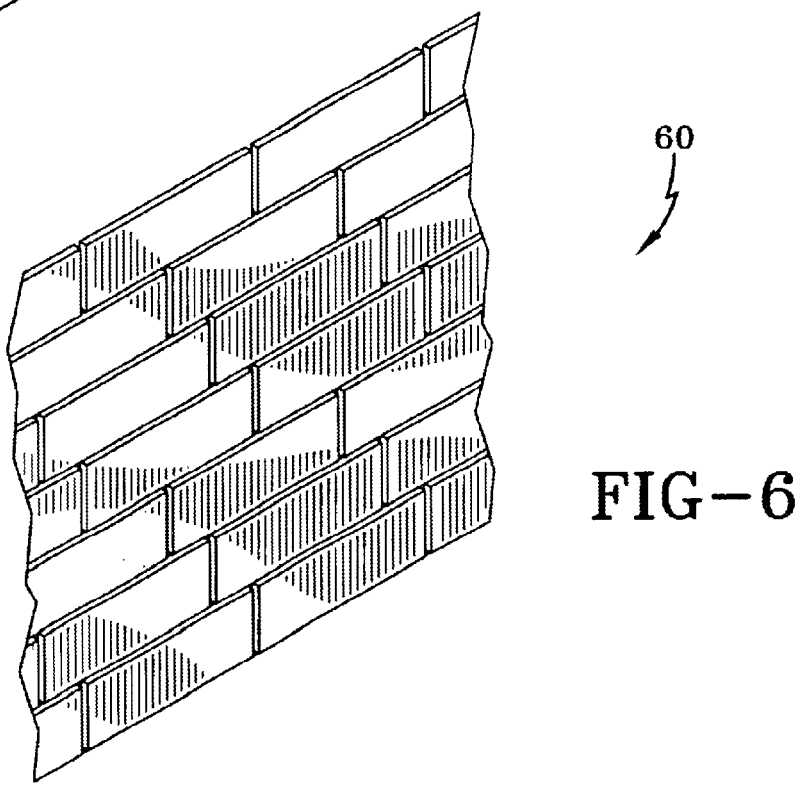
FIG. 6 is a partial perspective view of a second embodiment of a floor system of the present invention.

FIGS. 5 and 6 show examples of floor systems that are comprised of components of the present invention. In FIG. 5, the components of the floor system 50 are arranged in columns and rows. On the other hand, the components of the floor system 60 of FIG. 6 are staggered.

Adjacent components of any type of system may be connected so as to be adjoined or separated by a space. A space between adjacent components may be used to provide a drainage path. For example, dowels, spacers, or any other conventional, similar, or suitable devices may be used to connect adjacent components such that there are spaces therebetween.

Figure 7:
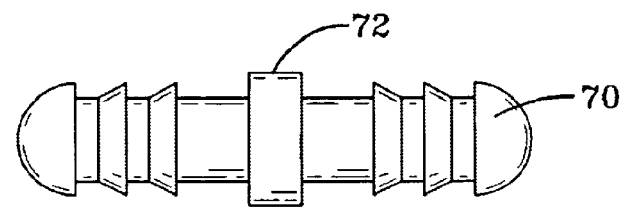
FIG. 7 is a side elevation view of one embodiment of a dowel that may be used to connect components of the present invention.
Figure 8:
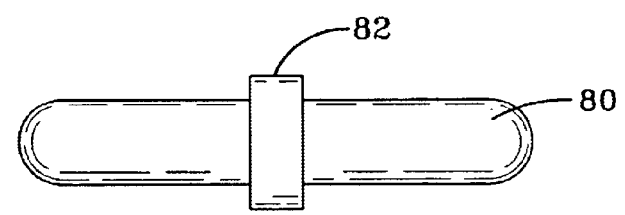
FIG. 8 is a side elevation view of a second embodiment of a dowel that may be used to connect components of the present invention.

FIG. 7 shows an example of a dowel 70 that may be used to connect adjacent components. One end portion of the dowel 70 may be inserted in a hole in the synthetic wood layer and/or the foamed polymer layer of one component, and the other end portion of the dowel 70 may be inserted in a hole in the synthetic wood layer and/or the foamed polymer layer of the other component. In order to facilitate leaving a space between the adjacent components, the dowel 70 may have at least one raised portion 72 that serves to separate the components a desired distance. Similarly, FIG. 8 illustrates another embodiment of a dowel 80 that has at least one raised portion 82 to maintain a space between adjacent components. The dowels may be made of any desired materials including, but not limited to, polymers, synthetic wood compositions, wood, metal, and other similar, suitable, or conventional materials.

Figure 9:
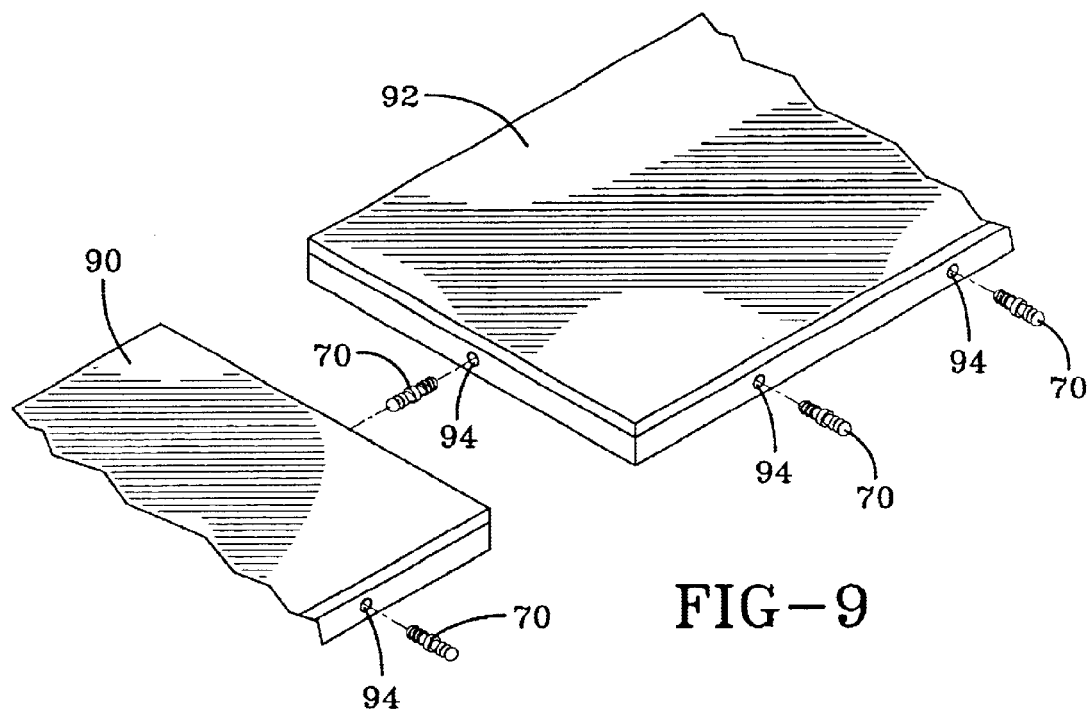
FIG. 9 is a perspective view of an example of how dowels may be used to connect components of the present invention.

FIG. 9 shows an example of how dowels 70 may be used to connect adjacent components. Holes 94 may be formed in the components 90, 92 by any desired method. Furthermore, the holes 94 may be positioned at predetermined intervals to enable the components to be connected together to form a desired pattern, e.g., system 50 or system 60. The dowels 70 may be inserted into respective holes 94 by screwing, pushing, or any other desired method. In addition, an adhesive may be used to help secure the dowels 70 in the holes 94, if desired.

Figure 10:
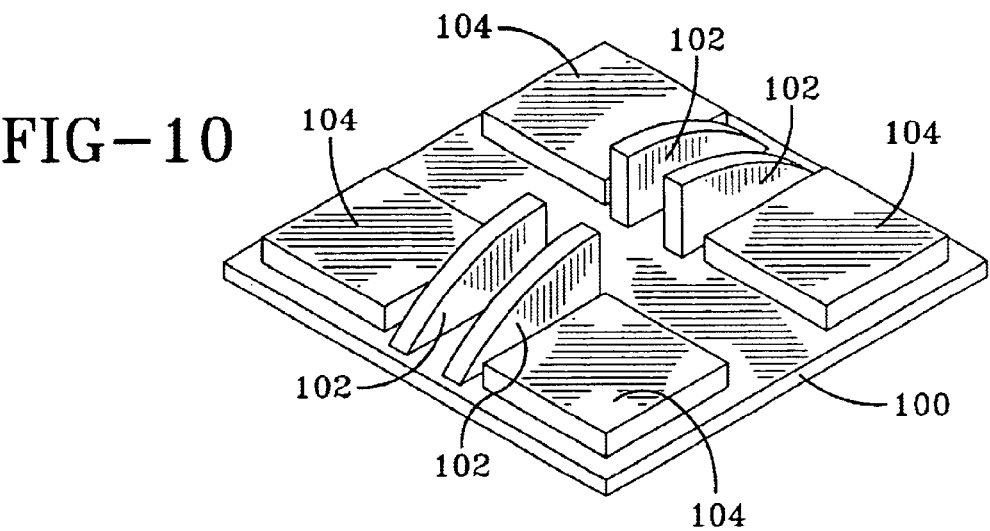
FIG. 10 is a perspective view of one embodiment of a spacer of the present invention.
Figure 11:
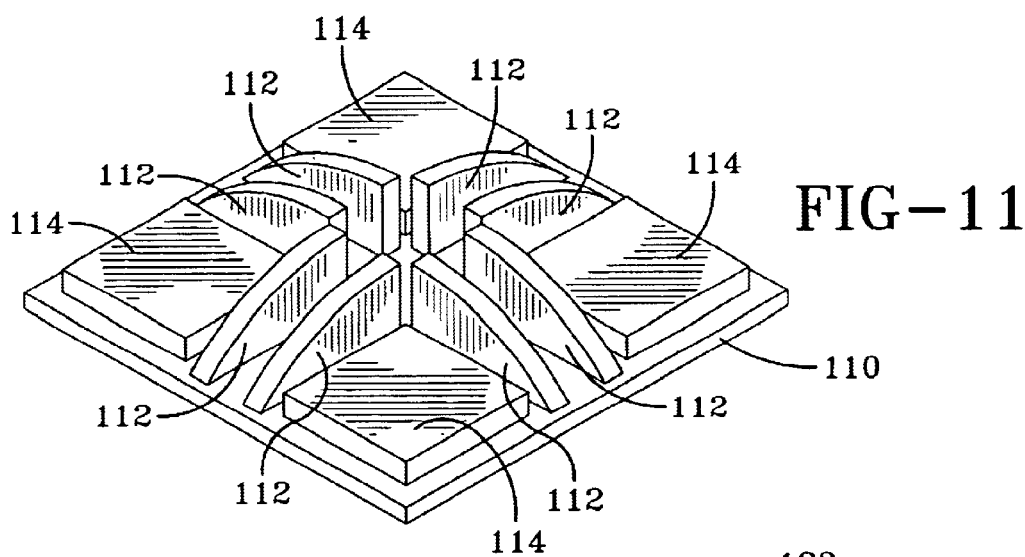
FIG. 11 is a perspective view of a second embodiment of a spacer of the present invention.
Figure 12:
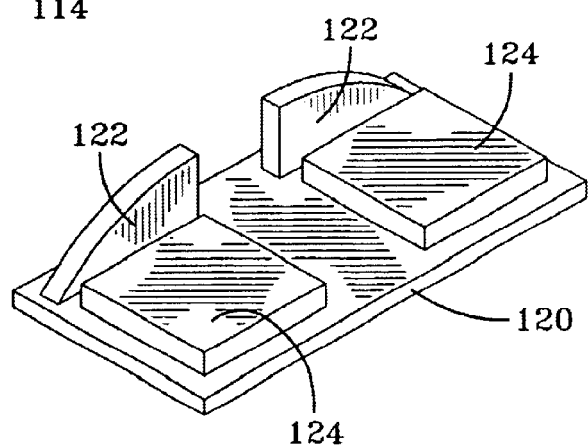
FIG. 12 is a perspective view of a third embodiment of a spacer of the present invention.

FIGS. 10 through 12 show examples of spacers that can be used to separate adjacent components. A spacer can have at least one raised portion to facilitate separating adjacent components a desired distance. Optionally, a spacer may also include at least one attachment portion for securing the spacer to one or more components. In this manner, the attachment portion(s) may help to maintain the desired space between adjacent components. In FIG. 10, the spacer 100 has raised portions 102 that extend upward from a base portion. In addition, this embodiment of the spacer 100 has attachment portions 104. Similarly, spacer 110 of FIG. 11 has raised portions 112 and attachment portions 114, and spacer 120 of FIG. 12 has raised portions 122 and attachment portions 124. The spacers 100, 110, 120 may be made of any desired materials including, but not limited to, polymers, synthetic wood compositions, wood, metal, and other similar, suitable, or conventional materials. Furthermore, the attachment portions 104, 114, 124 may be comprised of mechanical fastening devices, adhesives, and other similar, suitable, or conventional devices or materials. An example of an adhesive is foam tape.

Figure 13:
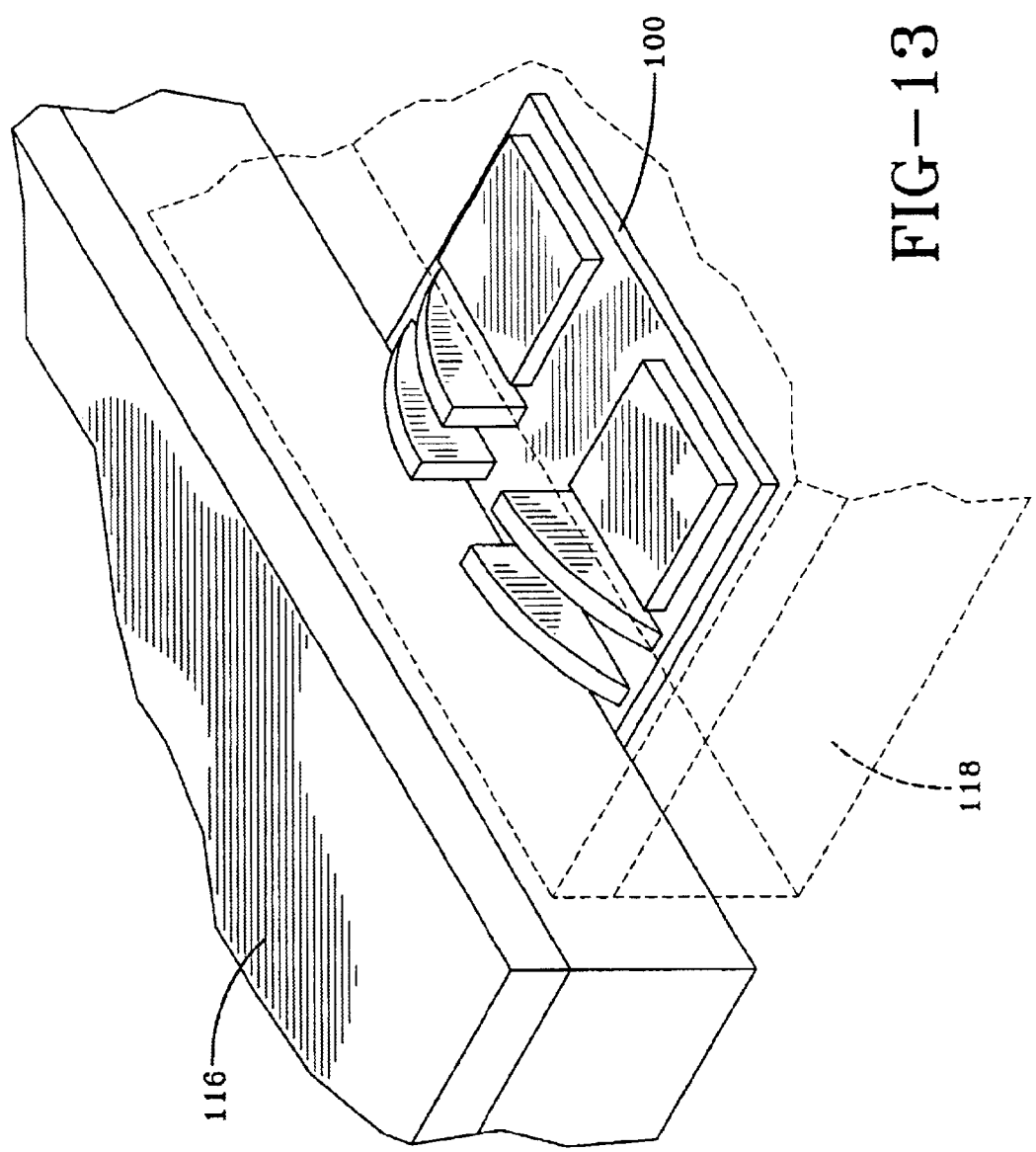
FIG. 13 is a partial perspective view of an example of how the spacer of FIG. 10 may be used to connect adjacent components of the present invention.
Figure 14:
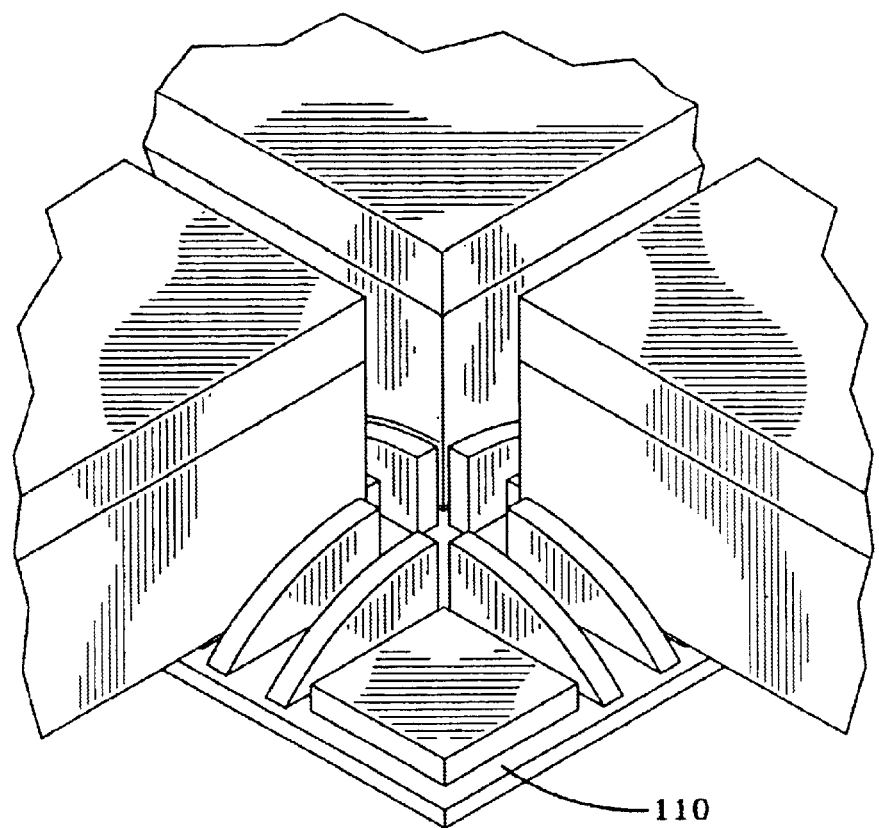
FIG. 14 is a partial perspective view of an example of how the spacer of FIG. 11 may be used to connect adjacent components of the present invention.
Figure 15:
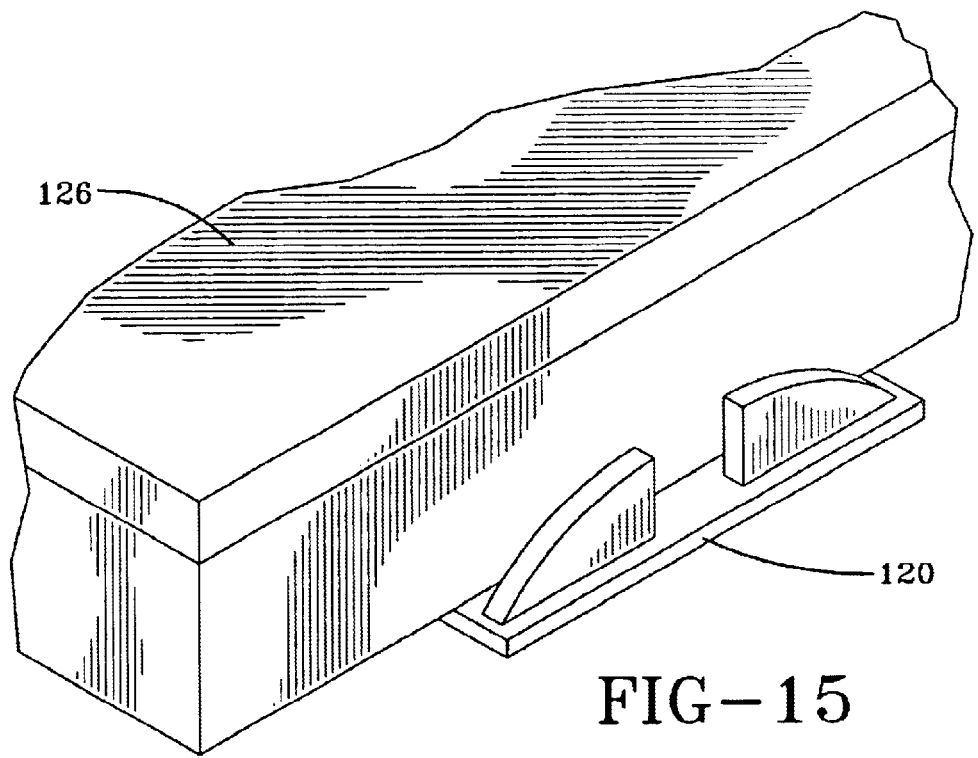
FIG. 15 is a partial perspective view of an example of how the spacer of FIG. 12 may be used along an outside edge of a component of the present invention.

FIG. 13 illustrates an example of how the spacer 100 can be used to separate adjacent components 116, 118 by a space. The component 118 is shown in phantom in order to more clearly show the function of the spacer 100. On the other hand, FIG. 14 shows an example of how the spacer 110 can be used to connect and separate adjacent components. In addition, FIG. 15 provides an example of how the spacer 120 can be used along an outer edge of a component 126.

Any desired synthetic wood compositions and foamed polymer compositions may be used in the present invention. For instance, the materials used to make the compositions of the present invention may include, but are not limited to, cellulosic fillers, polymers, plastics, thermoplastics, rubber, inorganic fillers, cross-linking agents, lubricants, process aids, stabilizers, accelerators, inhibitors, enhancers, compatibilizers, blowing agents, foaming agents, thermosetting materials, and other similar, suitable, or conventional materials. Examples of cellulosic fillers include sawdust, newspapers, alfalfa, wheat pulp, wood chips, wood fibers, wood particles, ground wood, wood flour, wood flakes, wood veneers, wood laminates, paper, cardboard, straw, cotton, rice hulls, coconut shells, peanut shells, bagass, plant fibers, bamboo fiber, palm fiber, kenaf, and other similar, suitable, or conventional materials. Examples of polymers include multilayer films, high density polyethylene (HDPE), polypropylene, PVC, low density polyethylene (LDPE), chlorinated polyvinyl chloride (CPVC), acrylonitrile butadiene styrene (ABS), ethyl-vinyl acetate, polystyrene, other similar copolymers, other similar, suitable, or conventional plastic materials, and formulations that incorporate any of the aforementioned polymers. Examples of inorganic fillers include talc, calcium carbonate, kaolin clay, magnesium oxide, titanium dioxide, silica, mica, barium sulfate, acrylics, and other similar, suitable, or conventional materials. Examples of thermosetting materials include polyurethanes, such as isocyanates, phenolic resins, unsaturated polyesters, epoxy resins, and other similar, suitable, or conventional materials. Combinations of the aforementioned materials are also examples of thermosetting materials. Examples of lubricants include zinc stearate, calcium stearate, esters, amide wax, paraffin wax, ethylene bisstearamide, and other similar, suitable, or conventional materials. Examples of stabilizers include tin stabilizers, lead and metal soaps such as barium, calcium, and zinc, and other similar, suitable, or conventional materials. In addition, examples of process aids include acrylic modifiers and other similar, suitable, or conventional materials.

Examples of synthetic wood compositions include, but are not limited to, plastic/cellulosic filler compositions, polymer/cellulosic filler compositions, thermosetting/cellulosic filler compositions, thermoplastic/cellulosic filler compositions, rubber/cellulosic filler compositions, foamed synthetic wood compositions, inorganic-filled plastic compositions, and other synthetic wood compositions that are known now or in the future. For instance, the synthetic wood composition may be a cellulosic/PVC composite material. The composite material may include at least one cellulosic filler in the amount of about 20% to about 70% by weight, more preferably about 50% to about 60% by weight. The composite may also include a PVC material in the amount of about 20% to about 70% by weight, more preferably about 25% to about 60% by weight, and still more preferably about 40% to about 50% by weight. Additionally, the composite may include at least one polar, thermosetting material in the amount of 0% to about 4% by weight, more preferably 0% to about 1% by weight.

The PVC material may include stabilizer(s) in an amount of about 1 to about 10 parts, more preferably about 2 to about 8 parts, still more preferably about 3 to about 7 parts, per 100 parts of the PVC resin. The lubricant(s) may be present in an amount of about 2 to about 12 parts, more preferably about 4 to about 10 parts, still more preferably about 6 to about 8 parts, per 100 parts of the PVC resin. Also, process aid(s) may be included in an amount of about 0.5 to about 8 parts, more preferably about 2 to about 6 parts, still more preferably about 1 to about 5 parts, per 100 parts of the PVC resin. Optionally, at least one inorganic filler may be added in an amount of up to about 10 parts, more preferably up to about 5 parts, per 100 parts of the PVC resin.

The cellulosic filler(s) may be dried to a desired moisture content. For example, the cellulosic filler(s) may be dried to about 0.5% to about 3% moisture content by weight, more preferably to about 0.5% to about 1% moisture content by weight. However, it is appreciated that the cellulosic filler(s) may have a moisture content less than about 0.5% by weight or greater than about 3% by weight.

The PVC material can be made by mixing a PVC resin, at least one stabilizer, at least one lubricant, at least one process aid, and optional other ingredients in a mixer. An example of a mixer is a high intensity mixer such as those made by Littleford Day Inc. or Henschel Mixers America Inc. As an example, the mechanically induced friction may heat the ingredients to a temperature between about 200° F. and about 230° F. After mixing, the ingredients may be cooled to ambient temperature. Optionally, the cellulosic material may be mixed with the PVC material in the mixer prior to introducing it to an extruder or another manufacturing device.

Another example of a synthetic wood composition is a cellulosic/polypropylene composite material. The composite material may be comprised of at least one cellulosic filler in an amount of about 30% to about 70% by weight, more preferably about 50% to about 60% by weight. Additionally, the composite material may be comprised of a polypropylene material in an amount of about 30% to about 70% by weight, more preferably about 40% to about 50% by weight.

The polypropylene material may include at least one lubricant in an amount of about 10 to about 20 parts per 100 parts of a polypropylene resin. More preferably, the polypropylene material includes at least one lubricant in an amount of about 14 to about 19 parts per 100 parts of the polypropylene resin. The polypropylene material may also include at least one inorganic filler in an amount up to about 70 parts, more preferably between about 20 and 60 parts, per 100 parts of the polypropylene resin.

On the other hand, the foamed polymer composition may a rigid or a relatively soft foamed polymer composition. An example of the foamed polymer composition is comprised of PVC resin in amount of about 100 parts. The composition may also include at least one stabilizer, at least one lubricant, at least one process aid, and at least one blowing agent. This example may also include at least one inorganic filler and at least one cellulosic filler. However, it should be recognized that some embodiments of the foamed polymer composition may not include any inorganic filler or cellulosic filler.

In this embodiment, the stabilizer(s) may be present in an amount of about 1.5 to about 7 parts, more preferably about 2 to about 4 parts, per 100 parts PVC resin. The lubricant(s) may be included in an amount of about 3 to about 10 parts, more preferably about 4 to about 6 parts, per 100 parts PVC resin. The process aid(s) may be present in an amount of about 6 to about 12 parts, more preferably about 8 to about 11 parts, per 100 parts PVC resin. The blowing agent(s) may be present in an amount of about 0.3 to about 1 parts, more preferably about 0.5 to about 0.8 parts, per 100 parts PVC resin. The inorganic filler(s) may be incorporated in an amount of about 6 to about 11 parts, more preferably about 8 to about 10 parts, per 100 parts PVC resin. Finally, the cellulosic filler(s) may be present in an amount of about 20 to about 55 parts, more preferably about 25 to about 45 parts, per 100 parts PVC resin.

As noted above, it should be appreciated that the above compositions are provided merely as examples. Each of the compositions may utilize any desired ingredients. Moreover, the synthetic wood compositions may include any desired amounts of any desired ingredients.

Figure 16:
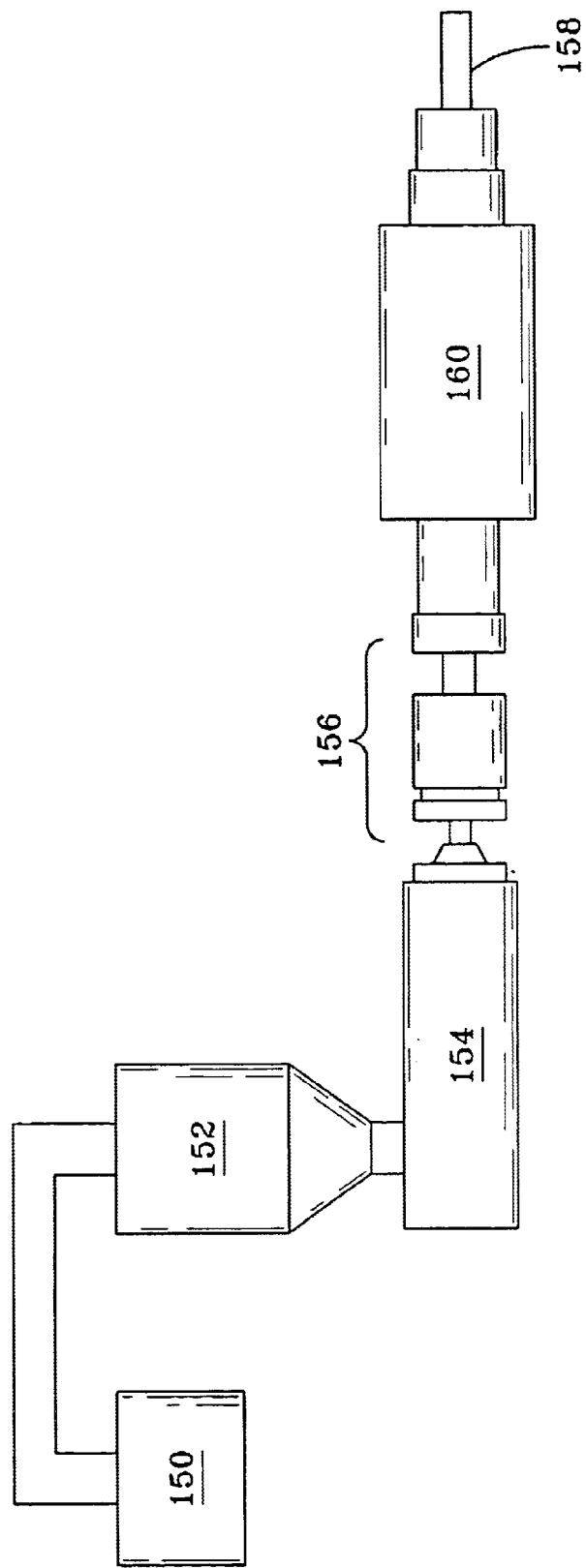
FIG. 16 is a schematic diagram of one embodiment of a manufacturing system that may be used to make a component of the present invention.

A component of the present invention may be formed by any suitable method. For example, a component of the present invention may be made using one or more manufacturing methods including, but not limited, extrusion, coextrusion, compression molding, and other conventional, similar, or suitable manufacturing methods used to make synthetic wood components and foamed polymer components. FIG. 16 is an example of an extrusion system that may be used to make a component of the present invention. The ingredients of a composition may be physically mixed or blended by any conventional mixing device or industrial blender 150. The composition may then be placed into a feed hopper 152. Feed hoppers such as gravity feed or force feed mechanisms (having a crammer) may be used. After the materials are mixed and transferred to the hopper 152, they are delivered to a heated extruder 154 where they are processed at a suitable speed and temperature. Several well-known extruders may be used in the present invention. For example, a twin screw extruder by Cincinnati Milacron (CM80-HP) may be used. In the extruder 154, the materials are blended and heated and then forced into a die system 156. The die system 156 is made up of one or more plates. The die system 156 allows the starting materials to bond and form a shaped-homogeneous product. The extruded material 158 may be cooled in a cooling chamber 160 and later cut to a required size.

Figure 17:
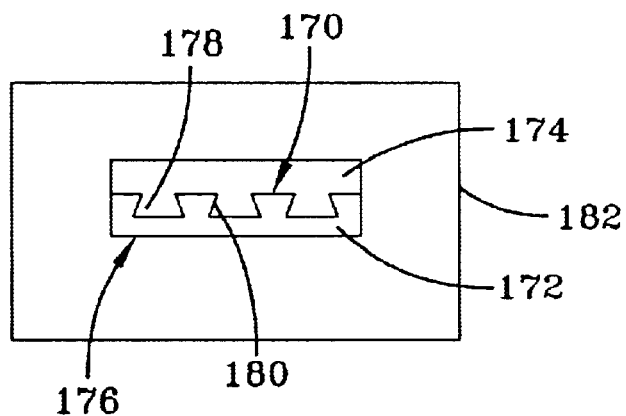
FIG. 17 is a cross sectional view of one embodiment of a die system that may be used to make a component of the present invention.

For another example, the synthetic wood composition layer and the foamed polymer composition layer may be simultaneously formed and joined together such as by coextrusion or compression molding. FIG. 17 shows an example of coextrusion. In FIG. 17, the die system 182 facilitates an optional mechanical lock feature 170 which bonds the synthetic wood composition layer 172 and the foamed polymer layer 174 of the extruded material 176 together. Angled pockets 178 in the synthetic wood composition layer 172 receive the foamed polymer layer 174. Since the coextrusion process is done under heat, the foamed polymer layer 174 flows into the pockets 178. Later as the coextrusion cools, the foamed polymer layer 174 bonds to the synthetic wood composition layer 172 and is locked in place within the pockets 178 of the synthetic wood composition layer 172. The pockets 178 may be formed with at least one acute angle 180 to enhance the interlock of the two layers 172 and 174. Nevertheless, as shown in FIGS. 1 through 4, it should be recognized that the synthetic wood composition layers of a coextrusion or molding may bond together without being interlocked. In addition, it should be noted that the use of the same thermoplastic material in the synthetic wood layer 172 and the foamed polymer layer 174 (e.g., a cellulosic/PVC composition layer and a foamed PVC layer) promotes chemical bonding of the layers without any outside bonding mechanism. However, the layers may still bond even if the layers do not contain the same thermoplastic material.

Figure 18:
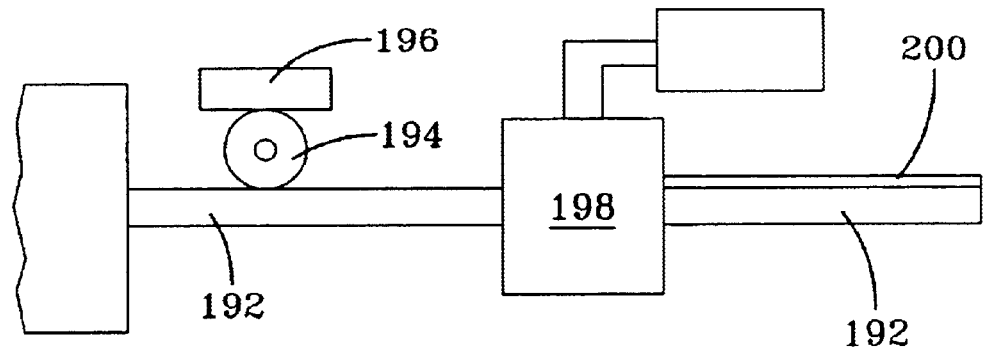
FIG. 18 is a schematic diagram of a second embodiment of a manufacturing system that may be used to make a component of the present invention.

Alternatively, a first layer of either synthetic wood or foamed polymer could be formed, and then the other layer could be formed on the first layer. An example of this manufacturing method is shown in FIG. 18. In FIG. 18, a foamed polymer layer 192 is first formed. Optionally, the foamed polymer layer 192 may be passed through an application system 194, e.g., a roller, for a tie material 196, e.g., an adhesive, to be placed on the layer 192. The layer 192 is then passed through a cross head die 198 and a synthetic wood composition layer 200 is added in a conventional hot melt process.

Figure 19:
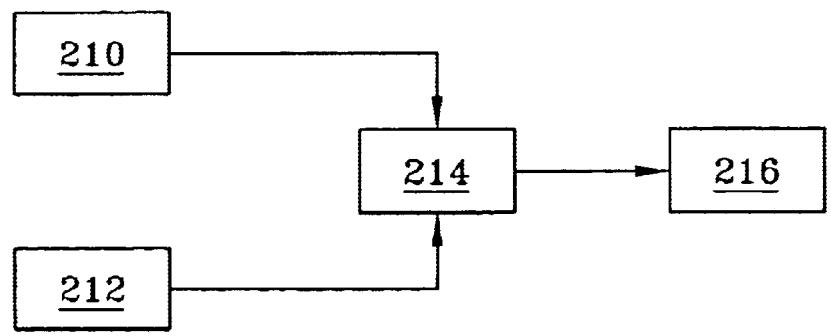
FIG. 19 is a flow diagram of a third embodiment of a manufacturing system that may be used to make a component of the present invention.

Another manufacturing method is to separately form each layer and then later connect the layers together. For example, each layer could be separately extruded or molded, allowed to cool, and then connected together to form the component. An example of this manufacturing method is shown in FIG. 19. In FIG. 19, two separate extrusion lines are formed. The first line 210 would be for the extrusion of a synthetic wood composition layer while the second line 212 would be for the extrusion of a foamed polymer layer. At a later point in the process, the two layers are formed together at 214 by any suitable means such as a tie layer or a mechanical fastening means. The resultant component 216 provides a unique combination of materials not heretofore seen in the art.

As shown by the above examples, the synthetic wood layer and the foamed polymer layer may be connected together by any suitable means. For example, the layers may be connected together by chemical bonding of the layers as the component exits a hot die without the use of a third material or a mechanical fastening device. Alternatively, a tie layer could be used to join the synthetic wood layer and the foamed polymer layer. Examples of tie layers include, but are not limited to, adhesives, epoxies, and polymers. It is also appreciated that the synthetic wood layer and the foamed polymer layer can be connected together by mechanical means including, but not limited to, nails, screws, bolts, clamps, braces, and other similar, suitable, or conventional mechanical fastening devices.

It is not intended to limit the present invention to a particular type or shape of component. A component of the present invention may be used in any desired application including, but not limited to, construction and other indoor and outdoor uses. For instance, a component of the present invention may be used as a replacement for known components made of wood, particle board, wafer board, plastic, synthetic wood compositions, single layer extrusions, metal, or combinations of these materials that are not used in high load bearing, structural applications. A component of the present invention is particularly useful in applications where the component will be subject to a humid environment. Examples of some uses of a component of the present invention include, but are not limited to, fencing, furniture, cabinets, storage devices, lawn edging, flower boxes, flooring, roofing, wall covering, building siding, basement flooring, basement wall covering, interior and exterior decorative house moldings, crown moldings, chair rails, picture frames, porch decks, deck railings, window moldings, window components, door components, door moldings, various other lawn and garden uses, various other below grade uses, and various other indoor and outdoor uses.

The present invention has been described primarily with reference to cellulosic/PVC composites and foamed PVC composites. However, the present invention includes many different synthetic wood compositions and foamed polymer compositions that are comprised of multilayer films, HDPE, polypropylene, LDPE, CPVC, ABS, ethyl-vinyl acetate, polystyrene, other similar copolymers, other similar, suitable, or conventional plastic materials, and formulations that incorporate any of the aforementioned polymers. For instance, preferred embodiments of the present invention include synthetic wood compositions and foamed polymer compositions that are comprised of PVC, polyethylene, polystyrene, PP, or ABS.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A component comprising:
   a synthetic wood layer comprising:
      cellulosic filler in an amount of about 20% to about 70% by weight; and
      polyvinyl chloride material in an amount of about 20% to about 70% by weight, said polyvinyl chloride material comprising:

polyvinyl chloride resin;
stabilizer in an amount of about 1 to about 10 parts per 100 parts of said polyvinyl chloride resin;
lubricant in an amount of about 2 to about 12 parts per 100 parts of said polyvinyl chloride resin; and
process aid in an amount of about 0.5 to about 8 parts per 100 parts of said polyvinyl chloride resin; and
a foamed polymer layer secured to said synthetic wood layer, said foamed polymer layer comprising:
polyvinyl chloride resin;
stabilizer in an amount of about 1.5 to about 7 parts per 100 parts of said polyvinyl chloride resin;
lubricant in an amount of about 3 to about 10 parts per 100 parts of said polyvinyl chloride resin;
process aid in an amount of about 6 to about 12 parts per 100 parts of said polyvinyl chloride resin; and
blowing agent in an amount of about 0.3 to about 1 part per 100 parts of said polyvinyl chloride resin:
wherein said foamed polymer layer is substantially free of cellulosic filler and inorganic filler.

2. The component of claim 1 wherein said synthetic wood layer is chemically bonded to said foamed polymer layer.

3. The component of claim 1 wherein said synthetic wood layer is secured to said foamed polymer layer by an adhesive.

4. The component of claim 1 wherein said synthetic wood layer is secure to said foamed polymer layer by a mechanical fastening device.

5. The component of claim 1 wherein the component is of a type selected from the group consisting of fence components, furniture components, cabinet components, storage device components, lawn edging components, flower box components, floor components, roof components, wall covering components, building siding components, basement floor components, basement wall covering components, decorative house molding components, crown molding components, chair rail components, picture frame components, porch deck components, deck railing components, window molding components, window components, door components, and door moldings.

6. The component of claim 1 wherein said synthetic wood layer comprises said cellulosic filler in an amount of about 50% to about 60% by weight.

7. The component of claim 1 wherein said synthetic wood layer comprises said polyvinyl chloride material in an amount of about 25% to about 60% by weight.

8. The component of claim 1 wherein said polyvinyl chloride material comprises:
said stabilizer in an amount of about 2 to about 8 parts per 100 parts of said polyvinyl chloride resin;
said lubricant in an amount of about 4 to about 10 parts per 100 parts of said polyvinyl chloride resin; and
said process aid in an amount of about 2 to about 6 parts per 100 parts of said polyvinyl chloride resin.

9. The component of claim 1 wherein said polyvinyl chloride material further comprises inorganic filler in an amount up to about 10 parts per 100 parts of said polyvinyl chloride resin.

10. The component of claim 1 wherein said foamed polymer layer comprises:
said stabilizer in an amount of about 2 to about 4 parts per 100 parts of said polyvinyl chloride resin;
said lubricant in an amount of about 4 to about 6 parts per 100 parts of said polyvinyl chloride resin;
said process aid in an amount of about 8 to about 11 parts per 100 parts of said polyvinyl chloride resin; and
said blowing agent in an amount of about 0.5 to about 0.8 part per 100 parts of said polyvinyl chloride resin.

11. A component comprising:
a synthetic wood layer comprising:
cellulosic filler in an amount of about 30% to about 70% by weight; and
polypropylene material in an amount of about 30% to about 70% by weight, said polypropylene material comprising:
polypropylene resin; and
lubricant in an amount of about 10 to about 20 parts per 100 parts of said polypropylene resin; and
a foamed polypropylene layer secured to said synthetic wood layer:
wherein said foamed polypropylene layer is substantially free of cellulosic filler and inorganic filler.

12. The component of claim 11 wherein said synthetic wood layer is chemically bonded to said foamed polypropylene layer.

13. The component of claim 11 wherein said synthetic wood layer is secured to said foamed polypropylene layer by an adhesive.

14. The component of claim 11 wherein said synthetic wood layer is secured to said foamed polypropylene layer by a mechanical fastening device.

15. The component of claim 11 wherein the component is of a type selected from the group consisting of fence components, furniture components, cabinet components, storage device components, lawn edging components, flower box components, floor components, roof components, wall covering components, building siding components, basement floor components, basement wall covering components, decorative house molding components, crown molding components, chair rail components, picture frame components, porch deck components, deck railing components, window molding components, window components, door components, and door moldings.

16. The component of claim 11 wherein:
said synthetic wood layer comprises said cellulosic filler in an amount of about 50% to about 60% by weight; and
said synthetic wood layer comprises said polypropylene material in an amount of about 40% to about 50% by weight.

17. The component of claim 11 wherein said polypropylene material comprises said lubricant in an amount of about 14 to about 19 parts per 100 parts of said polypropylene resin.

18. The component of claim 11 wherein said polypropylene material further comprises inorganic filler in an amount up to about 70 parts per 100 parts of said polypropylene resin.

* * * * *

UNITED STATES PATENT AND TRADEMARK OFFICE
CERTIFICATE OF CORRECTION

PATENT NO. : 6,863,972 B2
DATED : March 8, 2005
INVENTOR(S) : Burger et al.

It is certified that error appears in the above-identified patent and that said Letters Patent is hereby corrected as shown below:

Column 9,
Line 18, please delete "resin:" and insert -- resin; --.

Column 10,
Line 20, please delete "layer:" and insert -- layer; --.

Signed and Sealed this

Seventh Day of June, 2005

JON W. DUDAS
*Director of the United States Patent and Trademark Office*